J. F. PERKINS.
WEIGHING MACHINE.
APPLICATION FILED FEB. 1, 1911.
1,016,850.
Patented Feb. 6, 1912.
4 SHEETS—SHEET 1.
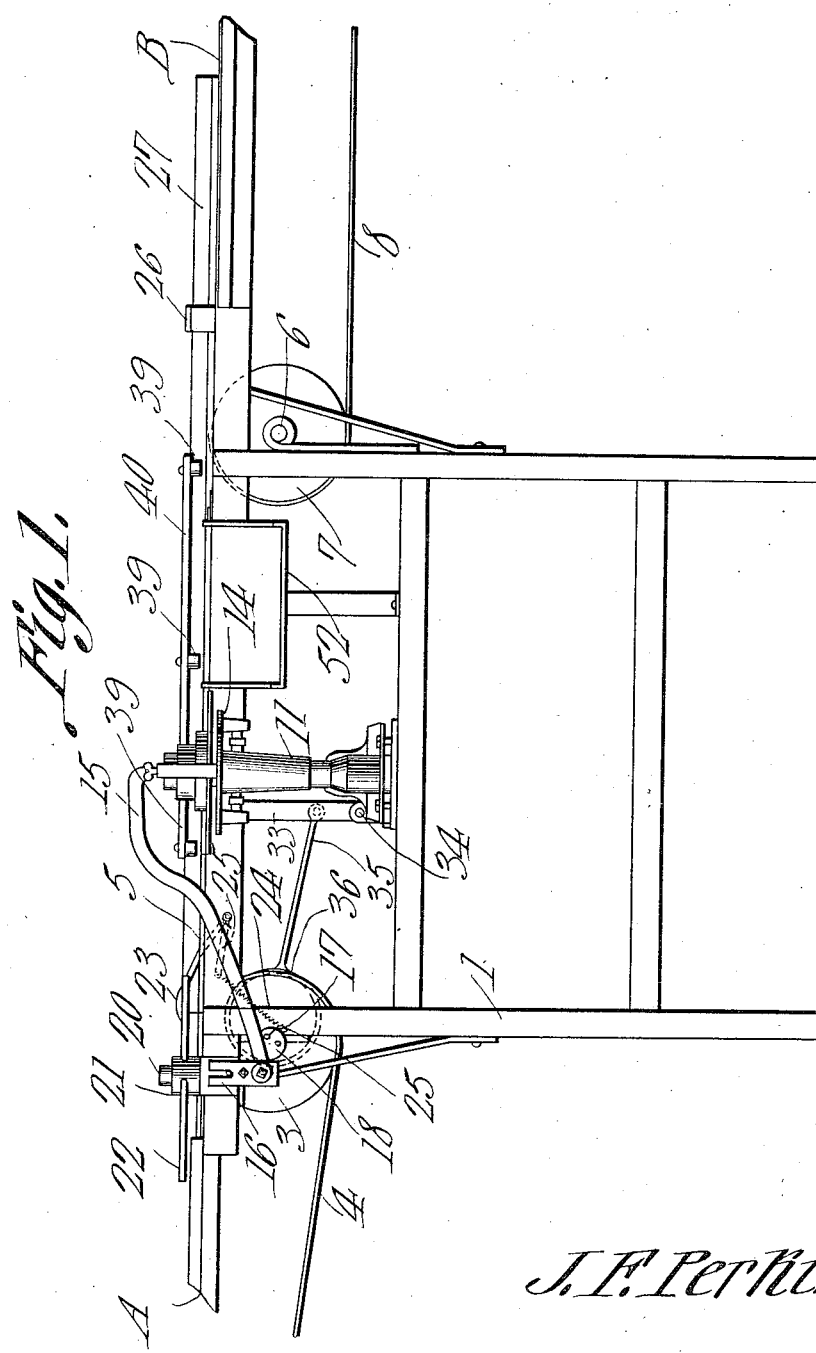
Witnesses
Inventor
J. F. Perkins
by C. A. Snow & Co.
Attorneys

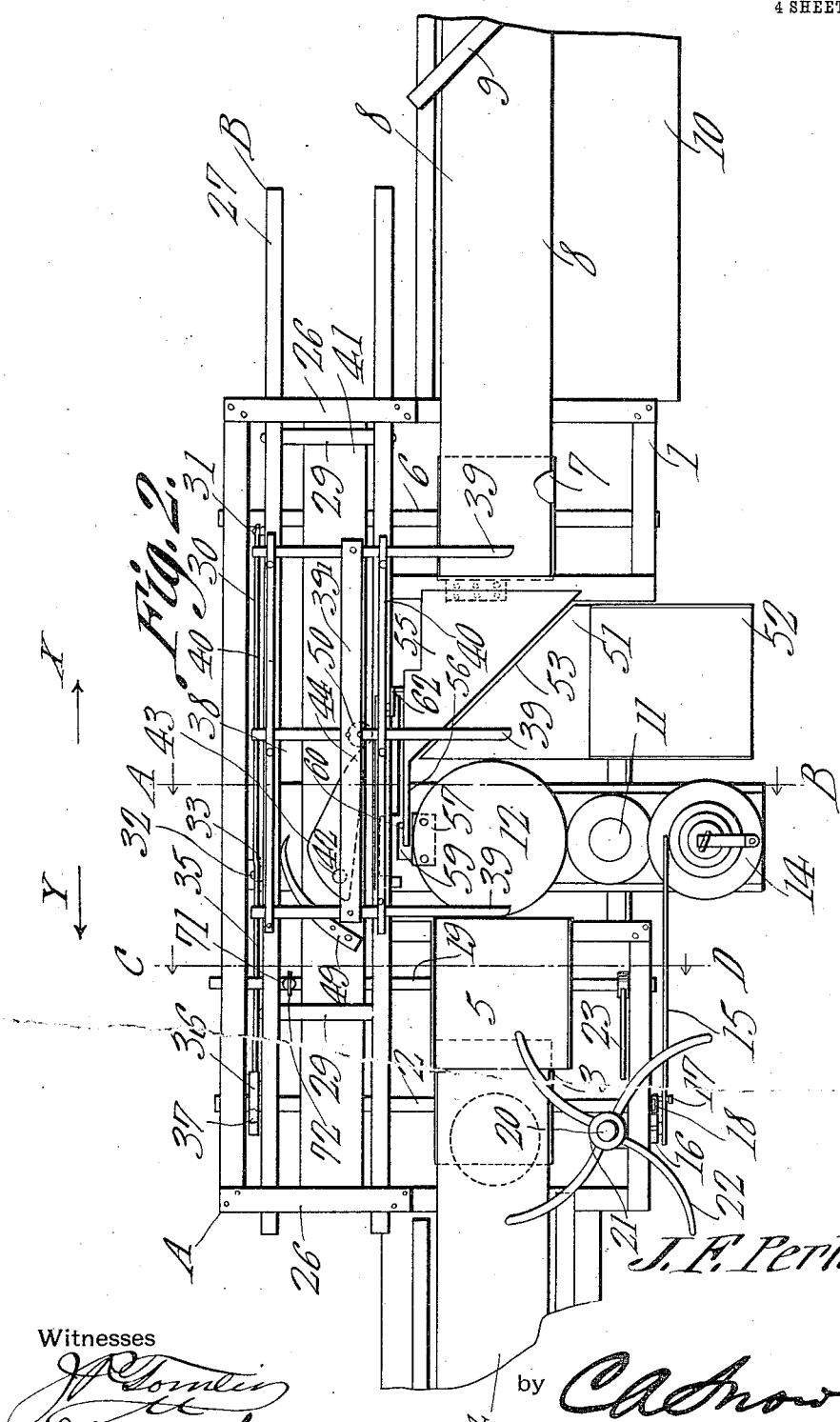

J. F. PERKINS.
WEIGHING MACHINE.
APPLICATION FILED FEB. 1, 1911.
1,016,850.
Patented Feb. 6, 1912.
4 SHEETS—SHEET 3.
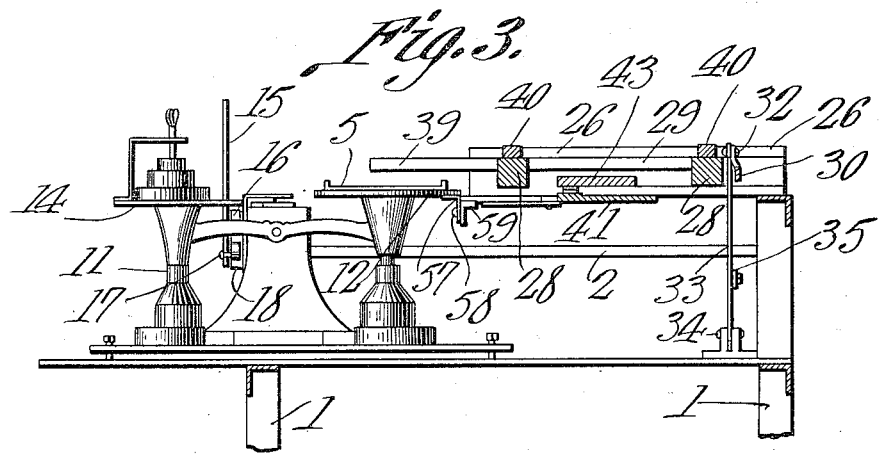
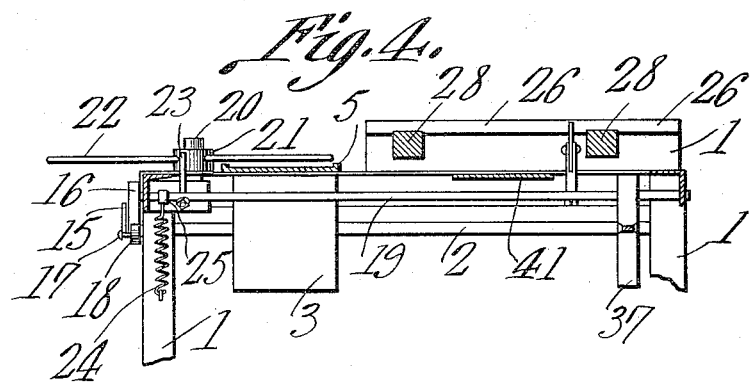

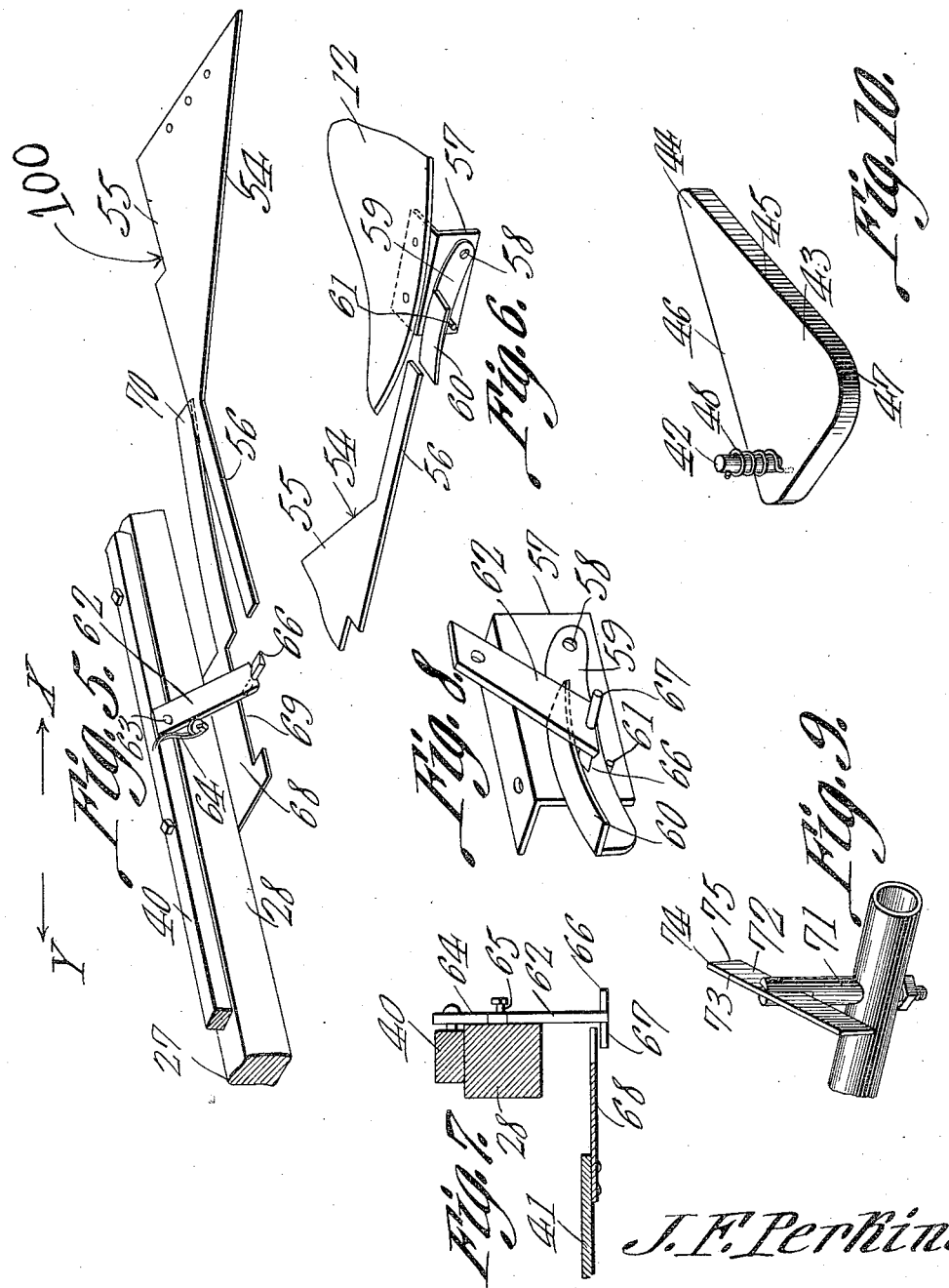

UNITED STATES PATENT OFFICE.

JAMES F. PERKINS, OF BLAINE, WASHINGTON, ASSIGNOR TO ARTHUR Y. SEELY, OF BLAINE, WASHINGTON.

WEIGHING-MACHINE.

1,016,850.

Specification of Letters Patent. Patented Feb. 6, 1912.

Application filed February 1, 1911. Serial No. 605,959.

*To all whom it may concern:*

Be it known that I, JAMES F. PERKINS, a citizen of the United States, residing at Blaine, in the county of Whatcom and State of Washington, have invented a new and useful Weighing-Machine, of which the following is a specification.

The device forming the subject matter of this application is adapted to be employed to weigh cans and the like, while the same are being conveyed from one point to another, and it is one object of this invention to provide means whereby articles which are under weight, may be segregated from full weight articles, while the articles are being conveyed through the machine.

Another object of the invention is to provide mechanism whereby the cans may be prevented from crowding into the machine, and to provide a reciprocating carriage, constituting at once, a means for advancing the cans upon the weighing device, and a means for actuating the can spacing mechanism.

Another object of the invention is to provide a divided platform, adapted to receive the cans after they are weighed, one part of this platform being actuable by the weighing device, for interposition in the path of the advancing cans, whereby a light weight can may be shunted to one side.

Another object of the invention is to provide means whereby the weighing mechanism may be held against oscillation, during the time that the weighing mechanism is unoccupied by a can.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 is a side elevation; Fig. 2 is a top plan; Fig. 3 is a transverse section upon the line A—B of Fig. 2, parts being removed; Fig. 4 is a transverse section upon the line C—D of Fig. 2, parts being removed; Fig. 5 is a detail perspective of the movable portion of the can-receiving platform, showing certain of the elements whereby the movable portion of the platform is actuated; Fig. 6 is a detail perspective showing a portion of the weighing device and the mechanism whereby the movable portion of the platform shown in Fig. 5, is actuated under certain circumstances, by the weighing device; Fig. 7 is a transverse section of the structure shown in Fig. 5, minor details being added thereto; Fig. 8 is a perspective of the arm whereby the movable portion of the platform is actuated; Fig. 9 is a fragmental perspective of the rock shaft and the pawl whereby the shaft is actuated by the carriage; Fig. 10 is a perspective of the cam and its associated elements.

Referring to Figs. 1 and 2, that end of the machine to which the character A is applied, will be referred to hereinafter as the forward end, that end of the machine to which the character B is applied, being referred to as the rear end.

In carrying out the invention there is provided a supporting frame 1, which may be of any desired construction. Journaled for rotation in the frame 1, and transversely disposed therein adjacent the forward end of the frame, is a shaft 2, carrying a pulley 3, about which is trained a conveyer belt 4. The cans which are to be weighed, are delivered to the machine by the belt 4, the cans, upon entering the machine, passing upon a frame-supported platform 5, located to the rear of the pulley 3.

From the platform 5, the cans, after having been weighed, are delivered by mechanism which will be described hereinafter, to a discharge mechanism, involving a transverse shaft 6, journaled for a rotation upon the frame 1, adjacent the rear end of the frame. Upon the shaft 6, there is a pulley 7, carrying a conveyer belt 8. The cans, having been weighed, will, if of full weight, be delivered upon the belt 8, and be carried in the direction of the arrow X in Fig. 2, into abutment with a diagonally disposed, frame-carried deflecting arm 9, the arm 9 directing the cans, transversely of the machine, upon a frame-supported table denoted by the numeral 10, and seen to best advantage in Fig. 2. It will of course be understood without specific illustration, that if the deflecting arm 9 be removed, the cans will be conveyed away from the machine, by the belt 8, instead of being deposited upon the table 10.

Located between the belts 4 and 8, and supported by the frame 1, is a weighing device 11, which may be of any standard construction. The receiving platform of the weighing device 11, denoted specifically by the numeral 12, is as shown most clearly in Figs. 2 and 3, disposed to the rear of, and in alinement with, the platform 5, upon which the cans are received when they are first delivered into the machine. The weighing device 11 is positioned transversely of the machine, as may be noted clearly in Fig. 2, the weight-receiving platform 14 of the weighing device ordinarily outstanding slightly beyond the contour of the frame 1.

The cans are delivered by mechanism to be described hereinafter, upon the receiving platform 12 of the weighing device and, having been weighed, are removed therefrom. In order to prevent an oscillation of the platforms 12 and 14 of the weighing device, during the time that the weighing device is not occupied by a can, a pivotally supported finger 15 is so mounted and operated that it may bear at its free end upon the weight platform 14, or some adjacent part of the weighing device, thereby steadying the weighing device, and rendering its operation more accurate. At its forward end, the rearwardly projecting finger 15 is pivoted to a bracket 16, adjustably supported upon the frame 1. The finger 15 is raised and lowered by engagement with a pin 17, projecting from a head 18, secured to one end of the shafts 2.

It will be seen that when the shaft 2 is rotated, the pin 17 will be interposed beneath, and withdrawn from, the finger 15, thereby permitting the free end of the finger 15 to descend upon the weighing device, the pin 17 lifting the free end of the finger from the weighing device, as the shaft 2 rotates.

Mechanism is provided whereby the cans will be prevented from being crowded by the belt conveyer 4, upon the platform 5, the object being to permit but one can at a time to pass from the platform 5 to the receiving platform 12 of the weighing device. This can spacing mechanism includes an upright spindle 20, supported for rotation upon the frame 1, the spindle carrying for free rotation, a spacer 21, equipped with radially projecting arms 22. The spacer 21 is actuated by the cans, the cans being advanced against the arms 22 of the spacer, by the belt 4.

In order to hold the can spacer 21 against continuous rotation under the pressure of the advancing cans, an arm 23, projecting from a rock shaft 19, is normally held interposed in the path of the arms 22 of the spacer, by means of a retractile spring 24, one end of which is secured to the frame (see Fig. 4) the other end of the spring being secured to a projecting arm 25 upon the rock shaft 19. The action of the spring 24 is to interpose the arm 23 in the path of the arm 22 of the spacer, successively, but when the rock shaft 19 is tilted slightly, the arm 23 will be removed from the path of the arms 22 of the spacer, permitting the spacer to rotate slightly, thereby permitting one can at a time to be advanced upon the platform 5.

The mechanism whereby the cams are advanced from the platform 5 upon the platform 12 of the weighing device 11 will now be described.

Slidably mounted beneath the frame-supported guide 26, for reciprocation in the direction of the arrows X and Y of Fig. 2, is a carriage, denoted generally in Fig. 2 by the numeral 27, the carriage 27 consisting of parallel bars 28, immediately engaged beneath the guides 26, the bars 28 being braced at suitable points, as shown at 29.

The mechanism for securing a reciprocation of the carriage 27 in the direction of the arrows X and Y, embraces a pitman 30, pivoted at its rear end, as denoted by the numeral 31, to the carriage 27, the forward end of the pitman 30 being pivoted, as shown at 32, to an upright rock arm 33 fulcrumed for tilting movement upon the frame 1, as shown at 34. The rock arm 33 is, in its turn, actuated by an arm 35, extended forwardly, and provided with a strap 36, embracing an eccentric 37, secured to the shaft 2 which is journaled in the frame 1 adjacent the forward end thereof.

It will be seen that when the shaft 2 rotates, the eccentric 37, the arm 35, the rock arm 33 and the pitman 30, will coöperate to secure a reciprocation of the carriage 27 in the direction of the arrows X and Y.

Mounted upon the carriage 27 for sliding movement at right angles to the direction in which the carriage itself reciprocates, is a frame 38, comprising a plurality of spaced fingers 39, braced as shown at 39′, the frame 38 being secured for reciprocation transversely of the carriage 27, by guides 40, mounted upon the bars 28 of the carriage. The fingers 39 of the frame overhang the platforms 5 and 12, but the frame may be retracted upon the carriage 27 so that, when the carriage 27 reciprocates in the direction of the arrows X and Y, the fingers 39 will not operate to advance the can from the platform 5 to the platform 12, or to drag the can in an opposite direction from the platform 12 to the platform 5.

The mechanism whereby the frame 38 is moved transversely upon the carriage 27, will now be described.

Supported upon the frame 1, and extended longitudinally of the machine, is a plate 41, to which is pivoted at 42, a cam 43. At its rear end, the cam 43 comes to a point 44, the converging edges of the cam which define the point 44, being denoted by the numerals 45 and 46, the end edge of the cam being rounded, as shown at 47. The cam 43 is yieldably held for movement in a horizontal plane, and any form of spring means adapted to effect this end, may be employed. In the present instance, one end of a coiled spring 48 is secured to the pivot element 42 of the cam, the other end of the spring being attached directly to the cam 43, so as to hold the point of the cam in the position shown in Fig. 2. In front of the cam 43 is a curvilinear guide arm 49, the same being preferably secured to the plate
41. The middle finger 39 of the frame 38 carries a roller 50, the cam 43 being interposed in the path of this roller.

Presupposing that the parts are positioned as shown in Fig. 2, when the carriage 27 is moved in the direction of the arrow Y, the roller 50 will traverse the edge 45 of the cam, this operation serving to retract the fingers 39 of the frame 38. As the carriage 29 is further retracted, the roller 50 will pass along the guide arm 49, between the guide arm and the end edge 47 of the cam. When the carriage 27 moves in the direction of the arrow X, the roller 50 will traverse the edge 46 of the cam, putting the spring 48 under slight tension, so that when the roller 50, having traversed the edge 46 of the cam, passes beyond the point 44 thereof, the point 44 will again be positioned to receive the roller 50, as shown in Fig. 2, so that the roller may again traverse the edge 45 of the cam, to secure another reciprocation of the frame 38 upon the carriage 27.

When the carriage 27 moves in the direction of the arrow X, the rear finger 39 will advance the can which has been weighed, from the scale platform 12 upon certain portions of the machine which will be described hereinafter, the middle finger 39 advancing a can which has not been weighed, from the platform 5 upon the scale platform 12. When, however, the carriage 27 moves in the direction of the arrow Y, the fingers 39 will, as hereinbefore pointed out, be retracted toward the carriage 27, thus permitting the fingers, when the carriage moves in the direction of the arrow X, to engage behind the can which is upon the platform 5, and behind the can which is upon the platform 12. At this point it may profitably be recalled that oscillation of the weighing device is prevented by the tiltable finger 15.

After the cans have been weighed upon the platform 12, they are advanced upon another platform, this latter platform consisting of a fixed, frame-supported portion 51, at the outer edge of which there is a chute 52, adapted to receive the light weight cans. The inner edge of the fixed portion 51 of the platform is diagonally disposed with respect to the line of advancement of the cans, as shown at 53, the edge 53 corresponding to the edge 54 of the movable portion 55 of the platform, this movable portion 55 being hingedly connected along its rear edge with the frame. The construction is such that when the light weight can passes through the machine, the free end of the portion 55 of the platform will be elevated, thus interposing the diagonal edge 54 of the portion 55, in the path of the light weight can, the light weight can being shunted into the chute 52. When, however, a full weight can passes through the machine, the portions 51 and 55 of the platform will remain in a common plane, so that the full weight can may be advanced by one of the fingers 39 of the frame 38, upon the belt conveyer 8.

The construction whereby the free end of the movable portion 55 of the platform is elevated, to intercept a light weight can, will now be described.

Noting particularly Fig. 5, it will be seen that the forward end of the movable portion 55 of the platform terminates in a finger 56. The mechanism whereby this finger 56 is engaged, to lift the diagonal edge 54 of the portion 55 of the platform, comprises a bracket 57, secured to one edge of the receiving platform 12 of the weighing device, a trigger 59 being pivoted to the bracket, as shown at 58. The trigger 59 is supplied along its upper edge with an outwardly projecting flange 60, a stop pin 61, outstanding from the bracket 57, serving to limit the tilting movement of the trigger.

An arm 62 is pivoted as shown at 63 to the carriage 27, the arm being maintained in the position shown in Fig. 5, by means of a spring 64, secured to a stud 65, mounted in the carriage 27, the upper, free end of the spring 64 bearing against the arm 62, above its pivotal mounting 63. The stud 65 likewise serves as a stop to receive the arm 62. Outstanding from one side of the arm 62 is a finger 66, adapted to be presented beneath the flange 60 of the trigger 59, this finger 66 being brought to a knife edge, in order to pass properly beneath the flange 60. Outstanding in an opposite direction from the arm 62, is a finger 67, preferably circular in transverse section, as shown in Fig. 8, the finger 67 being adapted to traverse longitudinally, a spring plate 68, notched at its forward end, as shown at 69, to permit the finger 67 to pass downwardly beneath the spring plate. The plate, at one end, as denoted by the numeral 70, is free, the plate curving downwardly, slightly, toward its free end 70. The spring 68 is attached in any chosen manner to the frame 1. If desired, as shown in Fig. 7, the plate 68 may be attached to the longitudinally extended, frame-carried plate 41.

Suppose that there is upon the scale platform 12, a can which is equal to, or greater than, the standard weight. Under such conditions, the scale platform 12 will be depressed, thereby positioning the flange 60 of the trigger 59 below the plane in which the finger 66 of the arm 62 moves. The flange 60 of the trigger 59 being, under normal conditions, as shown in Fig. 6, out of engagement with the finger 66 of the movable portion 55 of the platform, the portions 55 and 51 of the platform will be in a common plane, and when the carriage 27 is moved in the direction of the arrow X, one of the fingers 39 of the frame 38, engaging the full weight can upon the platform 12, will advance the can across the diagonal edges of the platform portions 51 and 55, placing the full weight can upon the belt 8, by which it will be carried away. When the carriage is moved in the direction of the arrow X, as above described, the finger 67 carried by the arm 62, will pass beneath the spring strip 68, elevating the free end 70 thereof, and putting the strip under slight tension. When the carriage 27 has reached the limit of its travel in the direction of the arrow X, the finger 67 will have passed out from under the free end 70 of the spring strip, so that the strip will assume the position shown in Fig. 5. When the carriage 27 is retracted in the direction of the arrow Y, the finger 67 will ride over the upper face of the spring strip 68, engagement between the finger 66 and the flange 60 of the trigger 59, being thus prevented when the carriage 27 is retracted in the direction of the arrow Y. When the carriage is at the limit of its movement in the direction of the arrow Y, the finger 67 will drop through the notch 69 in the spring strip 68, the parts being thus positioned again to repeat the operation. Suppose, however, that the carriage 27 has advanced upon the scale platform 12, a can which is under standard weight. Under said conditions, the scale platform 12 will remain elevated, the flange 60 of the trigger 59, pivotally carried by the scale platform 12, being interposed in the path of the knife edge finger 66 of the carriage supported arm 62. Under such circumstances, when the carriage 27 is advanced in the direction of the arrow X, the knife edge finger 66, moving beneath the flange 60, will elevate the trigger 59, the free end of the trigger engaging beneath the finger 56 of the movable portion 55 of the platform, and elevating said movable portion of the platform, so that its diagonal edge 53 is elevated above the diagonal edge 54 of the fixed portion 51 of the platform. Under such conditions, the edge 54, being interposed within the path of the advancing, light weight can, will deflect the can laterally into the chute 52. When the carriage 27 is retracted in the direction of the arrow Y, the arm 67 will ride over the spring strip 68, in the manner hereinbefore described in connection with the passage of the full weight can.

When the carriage moves in the direction of the arrow X, the finger 66, after traversing the flange 60 of the trigger, will ride along the under face of the portion 55 of the platform, the finger 66 passing upwardly to a notch 100 in one edge of the portion 55 of the platform, when the carriage is retracted in the direction of the arrow Y. The notch through which the finger 66 thus passes, is clearly shown in Fig. 5.

From the foregoing, it will be seen that the light weight cans will be deposited in the chute 52, the full weight cans passing onto the conveyer belt 8, to be delivered upon the table 10, or to be carried away by the belt conveyer 8, if, as hereinbefore described, the deflecting arm 9 be absent.

It has been pointed out hereinbefore that the rock shaft 19 must be actuated, in order to remove the finger 23, temporarily, from the path of the fingers 22 of the can spacer. In order to effect this result, the rock shaft 19 is equipped with an upstanding post 71, disposed in the path of reciprocation of the carriage 27. Pivotally supported by the post 71, is a tiltable pawl 72, the upper edge of which, denoted by the numeral 73, is disposed at an acute angle to the forward edge 75 thereof, in order to define a point 74 at the forward end of the pawl.

When the carriage moves in the direction of the arrow Y, the forward finger 39 of the frame 38 will ride along the upper edge 73 of the pawl, thereby tilting the pawl, this finger passing over the point 74 of the pawl, whereupon the point of the pawl will be lifted gravitationally into the path of the finger. When the carriage 27 moves in the direction of the arrow X, the finger above referred to will engage the pawl, tilting the rock shaft 19 and removing the arm 23 from the path of the arm 22 of the can spacer, the rock shaft 19 being returned to its original position, as hereinbefore described, by the action of the spring 24.

The operation of the device, generally considered, is as follows. The belt conveyer 4 will advance the can upon the platform 5, the arms 22 of the can spacer 21 preventing more than one can at a time from passing upon the platform 5, the tilting of the rock shaft 19 serving to remove the arm 23 from the path of the arms 22 of the can spacer, permitting the can spacer 21 to rotate after a single can has been advanced upon the platform 5. The shaft 2, through the instrumentality of the eccentric 37 and the pitman 30, will retract the carriage in the direction of the arrow Y, the roller 50 retracting the fingers 39, as the roller passes between the edge 47 of the cam 43 and the guide arm 49, so that one finger of the frame 38 will be positioned to engage the can which is upon the platform 5, the carriage, as it moves in the direction of the arrow X, advancing the can upon the platform 12, where it will be weighed during the interval in which the carriage 27 is being retracted in the direction of the arrow Y to engage another can which, by this time, has been positioned upon the platform 5. The can, having been weighed upon the scale platform 12, will be advanced upon the fixed portion 51 of the platform, and if this can is a full weight can, the portions 55 and 51 of the platform will remain in alinement, whereupon the full weight can will pass upon the conveyer belt 8. If, however, a light weight can has passed over the scale platform 12, the edge 54 of the movable portion 55 of the platform will be elevated, in the manner hereinbefore described, thus dumping the light weight can into the chute 52.

Having thus described the invention, what is claimed is:—

1. In a structure of the class described, a weighing device; a reciprocating carriage; a rack slidable upon the carriage transversely of its line of reciprocation; and means for advancing and retracting the rack upon the carriage to move one article after another across the weighing device.

2. In a structure of the class described, a frame; a weighing device; a carriage mounted for reciprocation upon the frame; a rack slidable upon the carriage transversely of its line of reciprocation; and interengaging elements upon the rack and the frame for advancing and retracting the rack upon the carriage to move one article after another across the weighing device.

3. In a structure of the class described, a frame; a weighing device; a carriage mounted for reciprocation upon the frame; a rack slidable upon the carriage transversely of its line of reciprocation; and a cam yieldably supported upon the frame; the rack having an element adapted to travel peripherally around the cam to advance and retract the rack upon the carriage, to move one article after another across the weighing device.

4. In a structure of the class described, a frame; a weighing device; a conveyer carried by the frame; a rotatable spacer mounted upon the frame and overhanging the conveyer; a frame-supported rock shaft; means upon the rock shaft to hold the spacer for step by step movement; a carriage slidable upon the frame and having means to advance one article after another of the conveyer across the weighing device; and interengaging elements upon the carriage and the rock shaft for actuating the rock shaft to permit a step by step movement of the spacer.

5. In a structure of the class described, a frame; a weighing device; a conveyer carried by the frame; a rotatable, frame-supported spacer overhanging the conveyer; a frame-supported rock shaft; means upon the rock shaft to hold the spacer for step by step movement; a carriage slidable upon the frame and having means to advance one article after another from the conveyer across the weighing device, and a pawl tiltably supported upon the rock shaft and engageable by the carriage to actuate the rock shaft and to permit a step by step movement of the spacer.

6. In a structure of the class described, a weighing device; a two-part platform, one part of which is tiltable; means for advancing an article across the weighing device upon the platform; the tiltable portion of the platform being liftable to present an edge diagonally to the line of advancement of said article; and interengaging means upon said part of the platform and the weighing device to lift said part.

7. In a structure of the class described, a weighing device; a two-part platform, one part of which is tiltable; a reciprocating carriage; a rack slidable upon the carriage transversely of its line of reciprocation; means for advancing and retracting the rack upon the carriage to move one article after another across the weighing device; one part of the platform being shiftable to present an edge diagonally to the line of movement of the carriage; and interengaging elements upon said part and the weighing device, to lift said part.

8. In a structure of the class described, a weighing device; a pivotally supported arm adapted to bear upon and to tilt the weighing device in its plane of normal movement, thereby to limit the oscillation of the weighing device; a rotatably supported shaft eccentrically engaging the arm to move the same into and out of engagement with the weighing device; and means for advancing an article across the weighing device.

9. In a structure of the class described, a weighing device; a pivotally supported arm adapted to bear upon and to tilt the weighing device in the plane of its normal movement, thereby to limit the oscillation of the weighing device; a rotatably supported shaft eccentrically engaging the arm to move the same into and out of engagement with the weighing device; a conveyer mounted upon said shaft; and means for advancing an article from the conveyer across the weighing device.

10. In a structure of the class described, a weighing device; a pivotally supported arm adapted to bear upon the weighing device to limit the oscillation thereof; a rotatably supported shaft eccentrically engaging the arm to move the same into and out of engagement with the weighing device; a reciprocating carriage; a rack slidable upon the carriage transversely of its line of reciprocation; and means for advancing and retracting the rack upon the carriage, to move one article after another across the weighing device.

11. In a structure of the class described, a weighing device; a pivotally supported arm adapted to bear upon the weighing device to limit the oscillation thereof; a rotatably supported shaft eccentrically engaging the arm to move the same into and out of engagement with the weighing device; a conveyer operable by said shaft; a reciprocating carriage; a rack slidable upon the carriage transversely of its line of reciprocation; and means for advancing and retracting the rack upon the carriage to move one article after another from the conveyer across the weighing device.

12. In a structure of the class described, a weighing device; a trigger pivoted thereto; a pivotally mounted deflecting element which the trigger is adapted to engage; a reciprocating carriage having means for advancing one article after another across the weighing device; and means upon the carriage for operating the trigger to actuate the deflecting element.

13. In a structure of the class described, a weighing device; a trigger pivoted thereto; a deflecting element positioned to be engaged by the trigger; a reciprocating carriage adapted to advance one article after another across the weighing device; an arm secured to the carriage; the arm having upon one side a finger adapted to actuate the trigger; the arm having a finger upon its opposite side; and a spring member engageable by the last named finger, when the carriage is moved in one direction, to hold the first named finger clear of the trigger.

14. In a structure of the class described, a weighing device; a trigger pivoted thereto; a movable deflecting element adapted to be engaged by the trigger; a reciprocating carriage; a rack slidable upon the carriage transversely of its line of reciprocation; means for advancing and retracting the rack upon the carriage to move one article after another from the weighing device against the deflecting element; and means upon the carriage for actuating the trigger.

In testimony that I claim the foregoing as my own, I have hereto affixed my signature in the presence of two witnesses.

JAMES F. PERKINS.

Witnesses:
CLARA RUTH COOKE,
F. K SIGFUSSOR.

Copies of this patent may be obtained for five cents each, by addressing the "Commissioner of Patents, Washington, D. C."